(12) United States Patent
Wee et al.

(10) Patent No.: US 8,627,336 B2
(45) Date of Patent: Jan. 7, 2014

(54) FEEDBACK SYSTEM AND METHOD FOR PROCESSING INCOMING DATA USING A PLURALITY OF MAPPER MODULES AND REDUCER MODULE(S)

(75) Inventors: Sewook Wee, San Jose, CA (US); John Mills Akred, San Jose, CA (US)

(73) Assignee: Accenture Global Services Limited, Dublin (IE)

(*) Notice: Subject to any disclaimer, the term of this patent is extended or adjusted under 35 U.S.C. 154(b) by 102 days.

(21) Appl. No.: 13/279,540

(22) Filed: Oct. 24, 2011

(65) Prior Publication Data

US 2013/0104145 A1 Apr. 25, 2013

(51) Int. Cl.
*G06F 9/44* (2006.01)
*H04L 29/06* (2006.01)

(52) U.S. Cl.
USPC .......................................... 719/313; 713/189

(58) Field of Classification Search
None
See application file for complete search history.

(56) References Cited

U.S. PATENT DOCUMENTS 7,072,296 B2 * 7/2006 Turner et al. ............... 370/230.1
8,423,791 B1 * 4/2013 Yu et al. ......................... 713/189
2010/0223341 A1 * 9/2010 Manolescu et al. ........... 709/206
2011/0161961 A1 * 6/2011 Fu .................................. 718/102
2011/0213655 A1 * 9/2011 Henkin et al. ............. 705/14.49

OTHER PUBLICATIONS

Tyson Condie et al., "MapReduce Online", found at website URL: http://www.neilconway.org/docs/nsdi2010_hop.pdf, last visited Jan. 26, 2012, 15 pages.
Article titled "MapReduce", found at Wikipedia website URL: http://en.wikipedia.org/w/index.php?oldid=452630866, last visited Jan. 26, 2012, 8 pages.
TechWorld blog, website URL: http://blogs.techworld.com/views-from-the-lab/2011/09/to-sql-or-nosql—thats-not-the-question/index.htm, last visited Jan. 26, 2012, 6 pages.

* cited by examiner

*Primary Examiner* — Andy Ho
*Assistant Examiner* — Abdou Seye
(74) *Attorney, Agent, or Firm* — Harrity & Harrity, LLP (57) ABSTRACT

System, methods, and apparatuses are provided for processing incoming data using a plurality of mapper modules and at least one reducer module. Incoming data may be processed to provide mapped data. The mapped data may be processed to provide reduced data. A feedback message may be generated. The feedback message may include data describing a suggestive configuration value to be applied when processing the incoming data.

40 Claims, 6 Drawing Sheets

FEEDBACK SYSTEM AND METHOD FOR PROCESSING INCOMING DATA USING A PLURALITY OF MAPPER MODULES AND REDUCER MODULE(S)

FIELD

The instant disclosure relates generally to the MapReduce software framework and, more specifically, to feedback-based systems and method for processing incoming data using a plurality of mapper modules and reducer module(s).

BACKGROUND

Data analytics is the science of examining raw data in order to draw conclusions about that information. Data analytics is used in many sectors to improve decision-making. As the use of data analytics continues to grow, the volume of data to be analyzed grows as well. Furthermore, data is being stored longer and longer as the value of that data becomes increasingly appreciated.

Given the ever-increasing volume of data, and the heightened reliance on techniques, such as, for example, data analytics for sifting through it, tools have been developed to sort, analyze, and manipulate the data in an effort to make it more manageable. One such tool is MapReduce. MapReduce is a software framework introduced by Google Inc. in 2004 to support distributed computing on large data sets on clusters of computers. The framework is inspired by map and reduce functions commonly used in functional programming. MapReduce uses two primitive functions, "Map" and "Reduce," to process incoming data.

Figure 1:
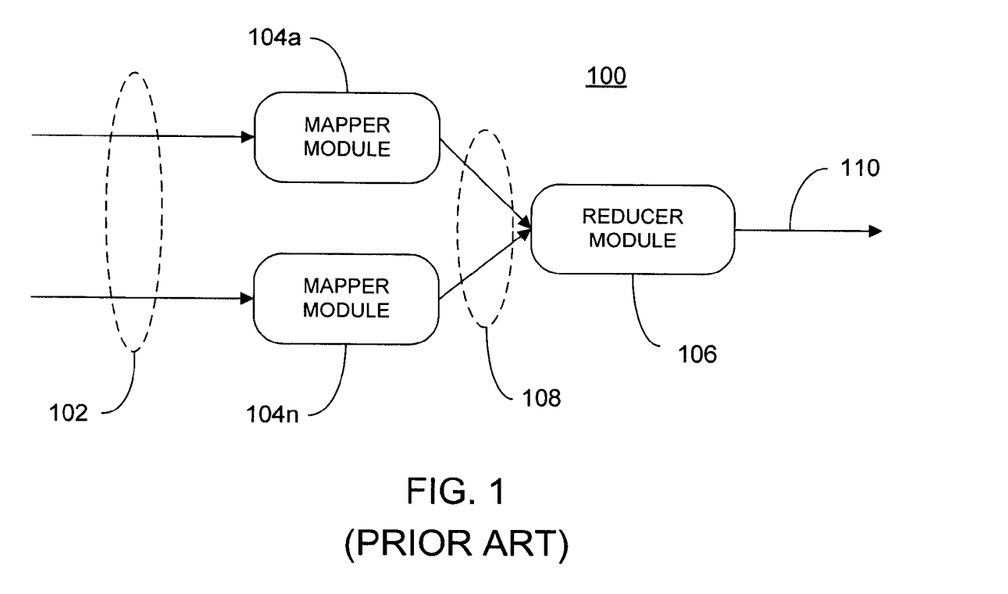
FIG. 1 is a block diagram illustrating one example of a prior art system for processing incoming data using a plurality of mapper modules and at least one reducer module.

Referring now to prior art FIG. 1, an existing system 100 for processing incoming data 102 in accordance with the MapReduce framework is illustrated. As shown in FIG. 1, incoming data 102 is broken-up into chunks, with each chunk being provided to one of a plurality of identical mapper modules 104a, 104n. The mapper modules 104a, 104n then perform processing on the incoming data 102, such as, but not limited to, filtering, transformation, or aggregation. The mapper modules 104a, 104n then transmit the mapped data 108 to the reducer module(s), such as reducer module 106. Although FIG. 1 only depicts two mapper modules 104a, 104n and a single reducer module 106, those having ordinary skill in the art will appreciate that any number of mapper modules and reducer modules may be employed. For example, in one embodiment, there are fewer reducer modules than mapper modules. The one or more reducer modules (e.g., reducer module 106) then process (e.g., aggregate) the mapped data 108 to provide reduced data 110.

Thus, conventional systems (e.g., system 100) for processing incoming data in accordance with the MapReduce framework are unidirectional. That is, in conventional systems the mapper modules transmit data to the reducer module(s), but the reducer module(s) do not transmit any data back to the mapper modules. The unidirectional nature with which existing systems process data in accordance with the MapReduce framework may result in less than optimal performance in many scenarios.

Accordingly, it is desirable to provide techniques for processing incoming data using a plurality of mapper modules and reducer module(s), such that the reducer modules can transmit data back to the mapper modules.

SUMMARY

The instant disclosure describes techniques and apparatuses for processing incoming data using a plurality of mapper modules and at least one reducer module. To this end, in one example, a system for processing incoming data is provided. The system includes a plurality of mapper modules and at least one reducer module in communication with at least one of the plurality of mapper modules. In this example, each mapper module is configured to process the incoming data to provide mapped data. Each at least one reducer module is configured to process the mapped data to provide reduced data. Further, the at least one reducer module is configured to generate a feedback message. The feedback message includes data describing a suggestive configuration value for at least one of the plurality of mapper modules to apply when processing the incoming data.

In one example, at least one of the plurality of mapper modules is further configured to receive the feedback message and process the incoming data by applying the suggestive configuration value from the feedback message to the incoming data in order to provide feedback-influenced data. In another example, at least one of the plurality of mapper modules is configured to receive the feedback message and process the incoming data without applying the suggestive configuration value from the feedback message to the incoming data in order to provide non-feedback-influenced data. In still another example, at least one of the plurality of mapper modules is configured to receive the feedback message and (1) process the incoming data without applying the suggestive configuration value for a time-period and then (2) process the incoming data by applying the suggestive configuration value at the expiration of the time-period. As used herein, a time-period can include a predetermined amount of time (e.g., 2 ms), a relative amount of time (e.g., 2 ms after an event), or an amount of time tied to an operation (e.g., after two clock-cycles), or upon receipt of new incoming data.

In one example, the at least one reducer module is further configured to receive the feedback-influenced mapped data and generate a new feedback message based on the feedback-influenced mapped data. In this example, the new feedback message includes data describing a new suggestive configuration value for at least one of the plurality of mapper modules to apply when processing the incoming data. In another example, the at least one reducer module is further configured to process the feedback-influenced mapped data to provide feedback-influenced reduced data.

In addition, there are a variety of ways in which the feedback message and/or the new feedback message can be transmitted to at least one of the plurality of mapper modules. In one example, the at least one reducer module is configured to transmit the feedback message directly to at least one of the plurality of mapper modules. For example, this can be accomplished through the use of a name node module in communication with the at least one reducer module and the plurality of mapper modules. In this example, the at least one reducer module is configured to receive mapper module identification data from the name node module, wherein mapper module identification data includes data describing at least one mapper module of the plurality of mapper modules. Accordingly, the at least one reducer module is configured to transmit the feedback message directly to at least one of the plurality of mapper modules based on the mapper module identification data.

In another example where the name node module is in communication with the at least one reducer module and the plurality of mapper modules, the at least one reducer module may be further configured to transmit the feedback message to the name node module. The name node module is then configured to transmit the feedback message to at least one of the plurality of mapper modules.

In one example, a messaging system module is in communication with the at least one reducer module and the plurality of mapper modules. In this example, the at least one reducer module is further configured to publish the feedback message to the messaging system module to provide a published feedback message. At least one of a plurality of mapper modules may be further configured to subscribe to the published feedback message to provide at least one subscribing mapper module. The messaging system module is configured to notify the at least one subscribing mapper module of the published feedback message and the at least one subscribing mapper module is configured to receive the published feedback message.

In another example, at least one of the plurality of mapper modules includes a listener thread in communication with a worker thread. In this example, the listener thread is configured to receive the feedback message. The worker thread is configured to (1) process, during reception of the feedback message by the listener thread, the incoming data and (2) receive the suggestive configuration value of the feedback message from the listener thread of the same at least one mapper module.

Related methods and apparatuses for carrying out the aforementioned techniques are also disclosed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 2:
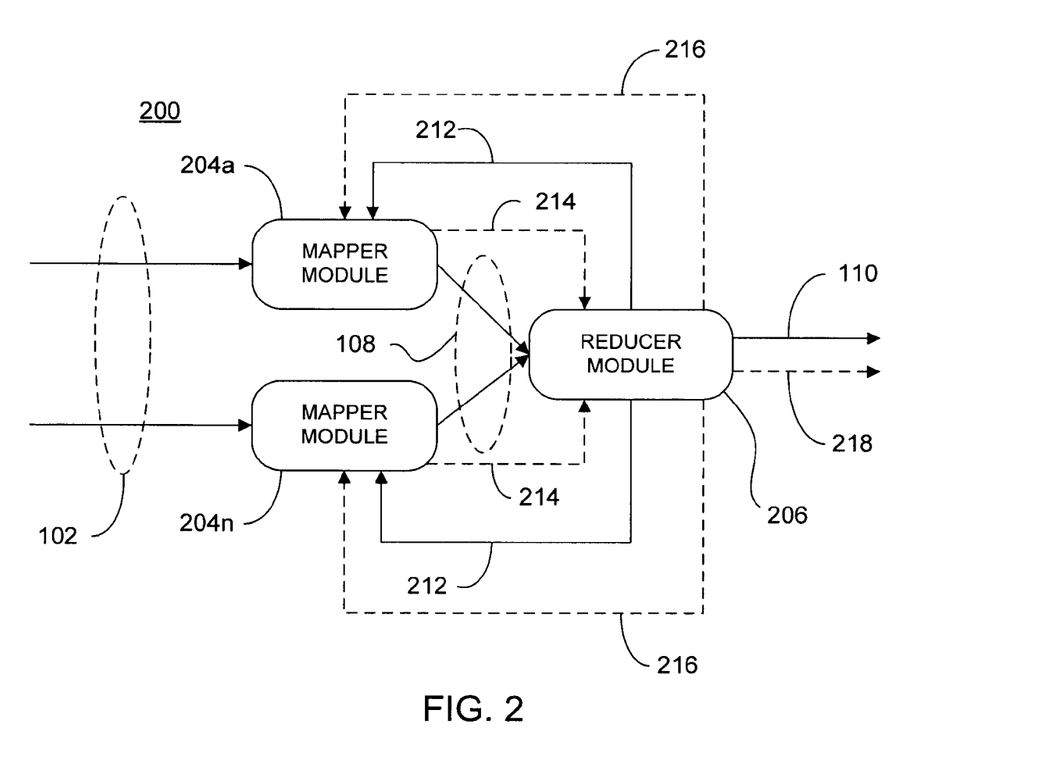
FIG. 2 is a block diagram illustrating one example of a system for processing incoming data using a plurality of mapper modules and at least one reducer module in accordance with the instant disclosure.

Referring now to FIG. 2, one example of a system 200 for processing incoming data 102 using a plurality of mapper modules and at least one reducer module is illustrated. In the illustrated example, system 200 includes mapper modules 204a, 204n and reducer module 206. While only two mapper modules 204a and 204n and a single reducer module 206 are illustrated, those having ordinary skill in the art will appreciate that any number of mapper modules and reducer modules may be employed, provided that there are fewer reducer modules than mapper modules. In an embodiment, the mapper modules 204a, 204n and reducer module 206 may be implemented using Apache™ Hadoop™ running on one or more suitable processing devices as described below relative to FIG. 6.

Each mapper module (e.g., mapper modules 204a and 204n) may be configured as a subscribing mapper module 504, as discussed in additional detail below with regard to FIG. 5. Furthermore, each mapper module (e.g., mapper modules 204a and 204n) may include a worker thread 328 and a listener thread 326, as discussed below with regard to FIG. 3. In addition, each reducer module (e.g., reducer module 206) may include a feedback message sender 324, as discussed below with regard to FIG. 3. Although not illustrated is FIG. 2, those having skill in the art will also appreciate that the components used in the different architectures for delivering a feedback message 212 (or a new feedback message 216) shown in FIGS. 3-5 may also be included in the system 200. For example, the name node module 320 and/or the messaging system module 532 may be included within the system 200 in accordance with the present disclosure.

System 200 operates as follows. Incoming data 102 is received by each mapper module (e.g., mapper modules 204a and 204n). Specifically, the incoming data is broken-up into chunks, with a different chunk being received by each mapper module. As used herein, the incoming data 102 may include any type of digital or analog data. Furthermore, the incoming data 102 may be supplied from any suitable source, such as, but not limited to, one or more databases, data repositories, etc. In one example, the incoming data may include graph data describing a graph consisting of vertices and edges that connect the vertices, as known in the art. The mapper modules 204a, 204n process (e.g., filter, transform, aggregate) the incoming data 102 to provide mapped data 108. The reducer module 206 that is in communication with the mapper modules 204a, 204n processes (e.g., filters, transforms, aggregates) the mapped data 108 to provide reduced data 110. Prior to, contemporaneous with, or following the production of the reduced data 110, the reducer module 206 generates a feedback message 212. The feedback message 212 includes data describing a suggestive configuration value (represented as element 327 in FIGS. 3-5) for the mapper modules 204a, 204n to apply when processing the incoming data 102.

Upon reception of the feedback message 212, the mapper modules 204a, 204n process the incoming data 102 in one of several ways. In one embodiment, the mapper modules 204a, 204n process the incoming data 102 by applying the suggestive configuration value 327 from the feedback message 212 to the incoming data 102 to provide feedback-influenced mapped data 214. For example, upon receiving the feedback message 212, the mapper modules 204a, 204n may immediately update their configurations to apply the suggestive configuration value 327 in processing all subsequently received incoming data 102. Techniques for modifying mapper modules are well known in the art. In another embodiment, upon receiving the feedback message 212, the mapper modules 204a, 204n may retain their initial configuration and not apply the suggestive configuration value 327 in processing any subsequently received incoming data 102. In still another embodiment, upon receiving the feedback message 212, the mapper modules 204a, 204n may retain their initial configuration for a time-period. The mapper modules 204a, 204n may then update their configurations to process the incoming data 102 at the expiration of the time-period. As used herein, a time-period can include a predetermined amount of time (e.g., 2 ms), a relative amount of time (e.g., 2 ms after an event), or an amount of time tied to an operation, such as a computing operation (e.g., after two clock-cycles), or upon receipt of new incoming data 102. Furthermore, while the term "configuration" is used herein, it is recognized that the configurations (e.g., suggestive configuration value 327 and/or new suggestive configuration value 329) could include any desirable parameter. For example, the configuration values could represent scaling factors, matching strings, etc.

By utilizing a suggestive configuration value, rather than a compulsory one, processing efficiencies may be gained. For example, if a compulsory configuration value were to be employed, one or more of the mapper modules (e.g., mapper module 204a and/or mapper module 204n) may need to restart the processing of the incoming data 102 by applying the compulsory configuration value to data that had been previously processed but not yet output. This may be an undesirable consequence in some circumstances.

Furthermore, it is not necessary that all mapper modules update their configurations simultaneously upon reception of a feedback message 212 including the suggestive configuration value 327 (although the present disclosure recognizes that simultaneous configuration updates across all mapper modules may be desirable in some instances). For example, permitting each mapper module to update its configuration independently of the other mapper modules may improve the scalability of the system 200. That is, if all mapper modules were required to update their configurations at the same time, a synchronization barrier would be added to the system 200, which could inhibit the scalability of the system 200.

After the mapper modules 204a, 204n have reconfigured themselves based on the suggestive configuration value 327 of the feedback message 212, they continue to process the incoming data 102 to provide feedback-influenced mapped data 214. This feedback-influenced mapped data 214 may be received by the reducer module 206. Following the reception of the feedback-influenced mapped data 214, the reducer module 206 may generate a new feedback message 216 based on the feedback-influenced mapped data 214. The new feedback message 216 includes data describing a new suggestive configuration value (represented as element 329 in FIGS. 3-5) for the mapper modules 204a, 204n to apply when processing the incoming data 102. Furthermore, the reducer module 206 may process the feedback-influenced mapped data 214 to provide feedback-influenced reduced data 218. Those having ordinary skill in the art will appreciate that this cycle of feedback messages and mapper module re-configurations could be repeated as often as necessary.

To understand the functionality of the system 200, consider an example where the incoming data 102 comprises graph data describing a graph consisting of vertices and edges that connect the vertices. In this example, the graph data may be broken down into vertex data and edge data. Continuing, in this example, the goal of the data processing may be to list out the top 500 vertices having the greatest number of edges (each vertex may have one or more edges).

First, the incoming graph data would be broken down into chunks, with each chunk being assigned to a different mapper module. For simplicity, assume that each mapper module is in an initialization state where it applies an initial configuration value in processing the graph data. The mapper modules will process the graph data based on their initial configuration value, and will filter out vertices having a number of edges less than the initial configuration value. The graph data representing the vertices having more edges than the initial configuration value (i.e., the mapped data) will be transmitted to the reducer module. The reducer module may then sort the mapped data to arrive at the 500 vertices having the most edges. The reducer module may then transmit a feedback message to the mapper modules establishing a suggestive configuration value for the mapper modules to apply when processing any subsequent incoming graph data. For example, the reduce function might set the suggestive configuration value to correspond to the number of edges associated with the vertex at 500th place. In this manner, the mapper modules that apply the suggestive configuration value will filter out all vertices containing fewer edges than the vertex at 500th place. This process may be repeated through as many iterations as desired in order to achieve the goal in mind. By progressively increasing the configuration value in this manner, the processing of the mapper modules and the reducer modules is made more efficient by reducing the number of vertices output by the mapper modules.

In order to achieve the functionality described above with respect to system 200, the instant disclosure provides an extending programming model from the traditional MapReduce programming model. Table 1 below illustrates a generic example of an extended programming model for the mapper module and Table 2 below illustrates a generic example of an extended programming model for the reducer module:

TABLE 1 function map(input[key, value], configuration):
   message = configuration.FBMR_message
   output[key, value] = process(input, message)
   if (output exists):
     commit(output)

TABLE 2 function reduce(input[key, value], configuration):
   output[key, value] = process(key, value)
   message = compute(key, value, state)
   if(message changed):
     FBMR.send(message)
   commit(output)

As illustrated by the above programming models, a reducer module sends a feedback message to a mapper module by calling a built-in function (FBMR.send) as needed. Note that, in this implementation, it is a programmer's responsibility to design an algorithm within the reducer module that computes a feedback message. This is because the feedback message will be application-specific.

The system 200 may then deliver the feedback message to the mapper module. Once the mapper module receives the feedback message, it updates it to the configuration variable. Once again, it is the programmer's responsibility to appropriately use the message (configuration.FBMR_message) in processing the input key/value pair (i.e., the incoming data 102).

Figure 3:
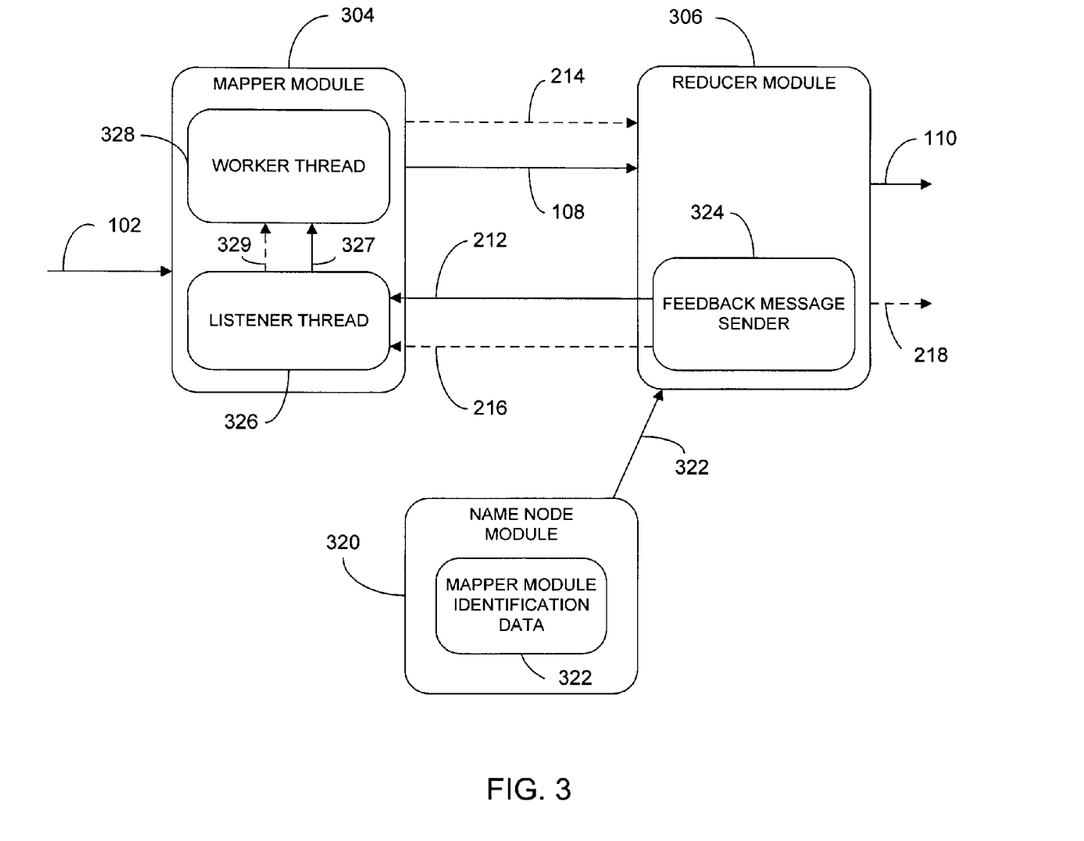
FIG. 3 is a block diagram illustrating one example of an architecture for delivering a feedback message from a reducer module to a mapper module in accordance with the instant disclosure.

Referring now to FIG. 3, an architecture for delivering a feedback message from a reducer module to a mapper module in accordance with the instant disclosure is illustrated. For simplicity, a single mapper module is illustrated in FIG. 3 (and FIGS. 4 and 5). However, it is understood that the mechanisms illustrated in FIGS. 3-5 can be applied to any number of mapper modules. As shown in FIG. 3, the mapper module 304 includes a worker thread 328 and a listener thread 326. The reducer module 306 includes a feedback message sender 324. Techniques for implementing such threads 328, 326 and the sender 324 are well known in the art. The feedback message sender 324 is configured to send a feedback message 212 (or a new feedback message 216) directly to the mapper module 304 in this example. Specifically, the feedback message sender 324 of the reducer module 306 may transmit a feedback message 212 to the listener thread 326 of the mapper module. Because the mapper module 304 is divided into two separate threads (i.e., the worker thread 328 and the listener thread 326) in this example, the listener thread 326 may receive the feedback message 212 (and hold it in queue) while the worker thread contemporaneously processes the incoming data 102. Then, when desired, the listener thread 326 may pass the suggestive configuration value 327 (or the new suggestive configuration value 329) of the feedback message 212 (or the new feedback message 216) to the worker thread 328 via a shared variable.

Also depicted in FIG. 3 is an optional name node module 320 in communication with the reducer module 306. In this example, the name node module 320 includes mapper module identification data 322 (e.g., a list of all of the mapper modules in the system). In this manner, the reducer module 306 is configured to receive the mapper module identification data 322 from the name node module 320. The reducer module 306 may then transmit the feedback message 212 (or the new feedback message 216) directly to the mapper module 304 based on the map identification data 322. As the framework disclosed in the instant application can add or decommission mapper modules during processing of the incoming data 102, this architecture permits the reducer modules to communicate with the name node module in order to check the up-to-date mapper module list.

Figure 4:
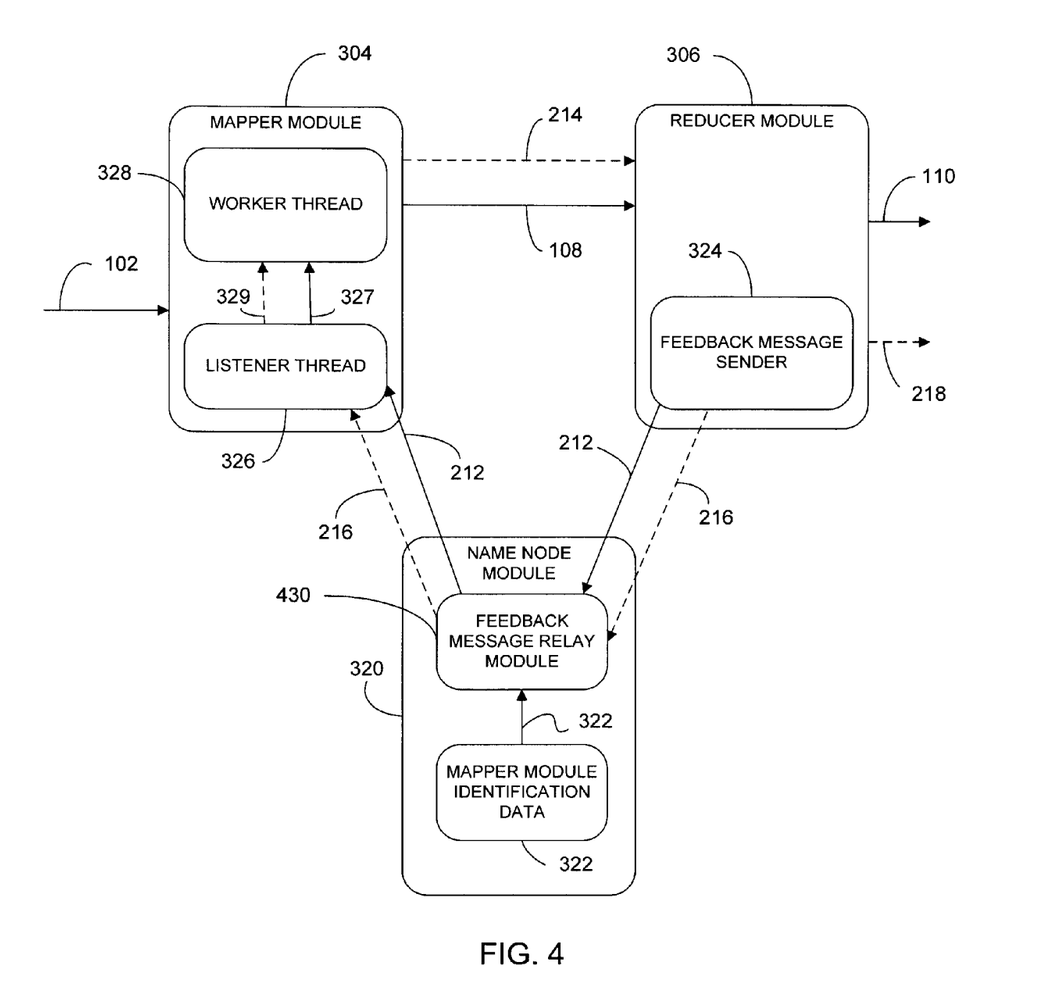
FIG. 4 is a block diagram illustrating another example of an architecture for delivering a feedback message from a reducer module to a mapper module in accordance with the instant disclosure.

Referring now to FIG. 4, another architecture for delivering a feedback message from a reducer module to a mapper module in accordance with the instant disclosure is illustrated. The architecture shown in FIG. 4 operates similarly to the architecture shown in FIG. 3; however, in this architecture the name node module 320 includes a feedback message relay module 430 configured to relay feedback messages 212, 216 from the reducer module 306 to the mapper module 304. This may be a desirable architecture given that the name node module 320 already includes the mapper module identification data 322 needed to identify which mapper module(s) should receive particular feedback messages 212, 216. The feedback message relay module 430 may receive the mapper module identification data 322 and use it to transmit the feedback messages 212, 216 to the appropriate mapper module(s), such as mapper module 304.

Figure 5:
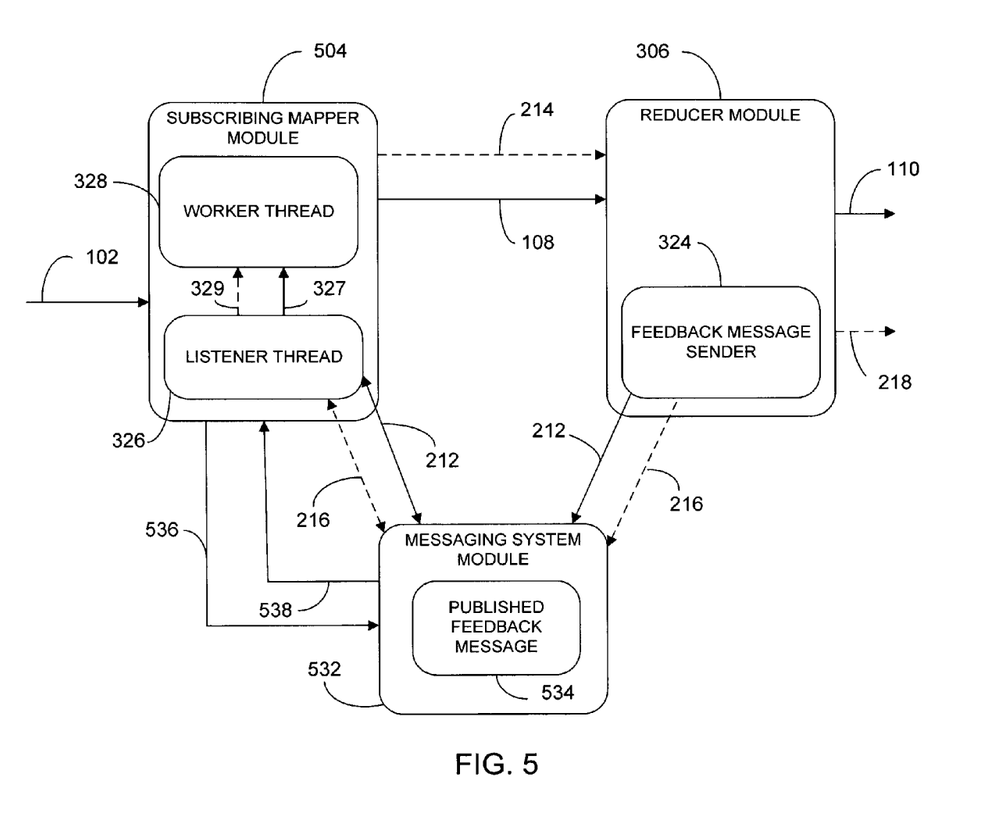
FIG. 5 is a block diagram illustrating yet another example of an architecture for delivering a feedback message from a reducer module to a mapper module in accordance with the instant disclosure.

Referring now to FIG. 5, yet another architecture for delivering a feedback message from a reducer module to a mapper module in accordance with the instant disclosure is illustrated. The architecture shown in FIG. 5 operates similarly to the architecture shown in FIG. 4; however, in this architecture the name node module 320 is replaced with a messaging system module 532. In this architecture, the reducer module 306 is configured to publish the feedback messages 212, 216 to the messaging system module 532 to provide one or more published feedback messages 534. Additionally, in this architecture, the mapper module is depicted as a subscribing mapper module 504. A subscribing mapper module, such as subscribing mapper module 504, is configured to subscribe to one or more published feedback messages 534 by, for example, issuing a subscription request 536 to the messaging system module 532. Accordingly, the messaging system module 532 is configured to notify the subscribing mapper module 504 of one or more published feedback messages 534 to which it subscribes, by transmitting a published feedback message notification 538 to the subscribing mapper module 504. As such, the subscribing mapper module 504 is configured to receive (i.e., retrieve from the messaging system module 532 or receive via a transmission from the messaging system module 532) the one or more published feedback messages 534.

Figure 6:
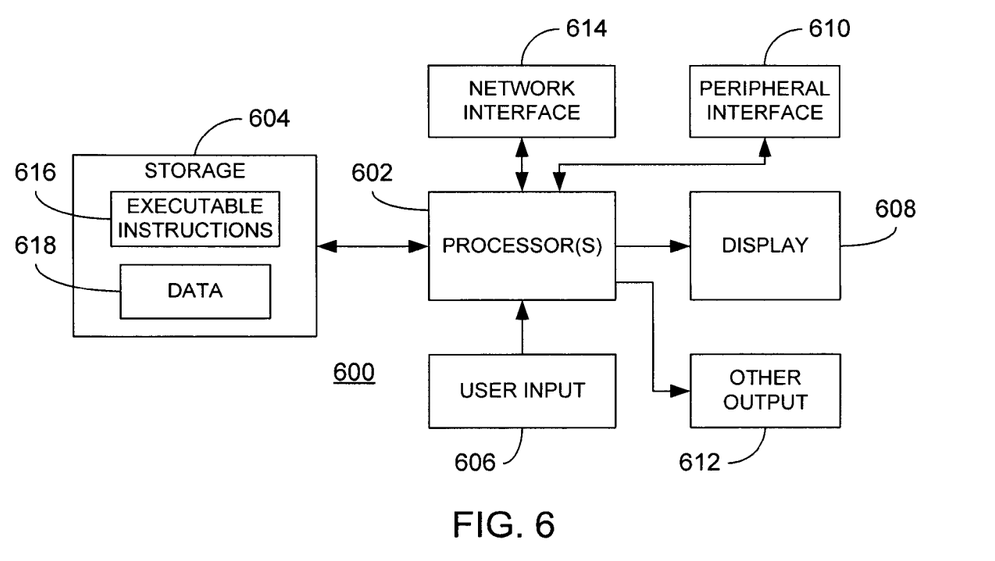
FIG. 6 is a block diagram illustrating one example of one or more processing devices that may be used to implement various embodiments of the instant disclosure.

In an embodiment, the system 200 illustrated in FIG. 2 is implemented using one or more suitably programmed processing devices, such as the processing device 600 illustrated in FIG. 6. The processing device 600 may be used to implement, for example, one or more components of the system 200, as described in greater detail above. Regardless, the processing device 600 includes one or more processors 602 coupled to a storage component 604. The storage component 604, in turn, includes stored executable instructions 616 and data 618. In an embodiment, the processor 602 may include one or more devices such as microprocessors, microcontrollers, digital signal processors, or combinations thereof capable of executing the stored instructions 616 and operating upon the stored data 618. Likewise, the storage component 604 may include one or more devices such as volatile or nonvolatile memory including, but not limited to, random access memory (RAM) or read only memory (ROM). Further still, the storage component 604 may be embodied in a variety of forms, such as a hard drive, optical disc drive, floppy disc drive, etc. Processor and storage arrangements of the types illustrated in FIG. 6 are well known to those having ordinary skill in the art, for example, in the form of laptop, desktop, tablet, or server computers. In one embodiment, the processing techniques described herein are implemented as a combination of executable instructions and data within the storage component 604.

As shown, the processing device 600 may include one or more user input devices 606, a display 608, a peripheral interface 610, other output devices 612, and a network interface 614 in communication with the processor(s) 602. The user input device 606 may include any mechanism for providing user input to the processor(s) 602. For example, the user input device 606 may include a keyboard, a mouse, a touch screen, a microphone, a suitable voice recognition application, or any other means, whereby a user of the processing device 600 may provide input data to the processor 602. The display 608 may include any conventional display mechanism such as a cathode ray tube (CRT), flat panel display, or any other display mechanism known to those having ordinary skill in the art. In an embodiment, the display 608, in conjunction with suitable stored instructions 616, may be used to implement a graphical user interface. Implementation of a graphical user interface in this manner is well known to those having ordinary skill in the art. The peripheral interface 610 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 612 may optionally include similar media drive mechanisms, other processing devices, or other output destinations capable of providing information to a user of the processing device 600, such as speakers, LEDs, tactile outputs, etc. Finally, the network interface 614 may include hardware, firmware, and/or software that allows the processor(s) 602 to communicate with other devices via wired or wireless networks, whether local or wide area, private or public, as known in the art. For example, such networks may include the World Wide Web or Internet, or private enterprise networks, as known in the art.

Figure 7:
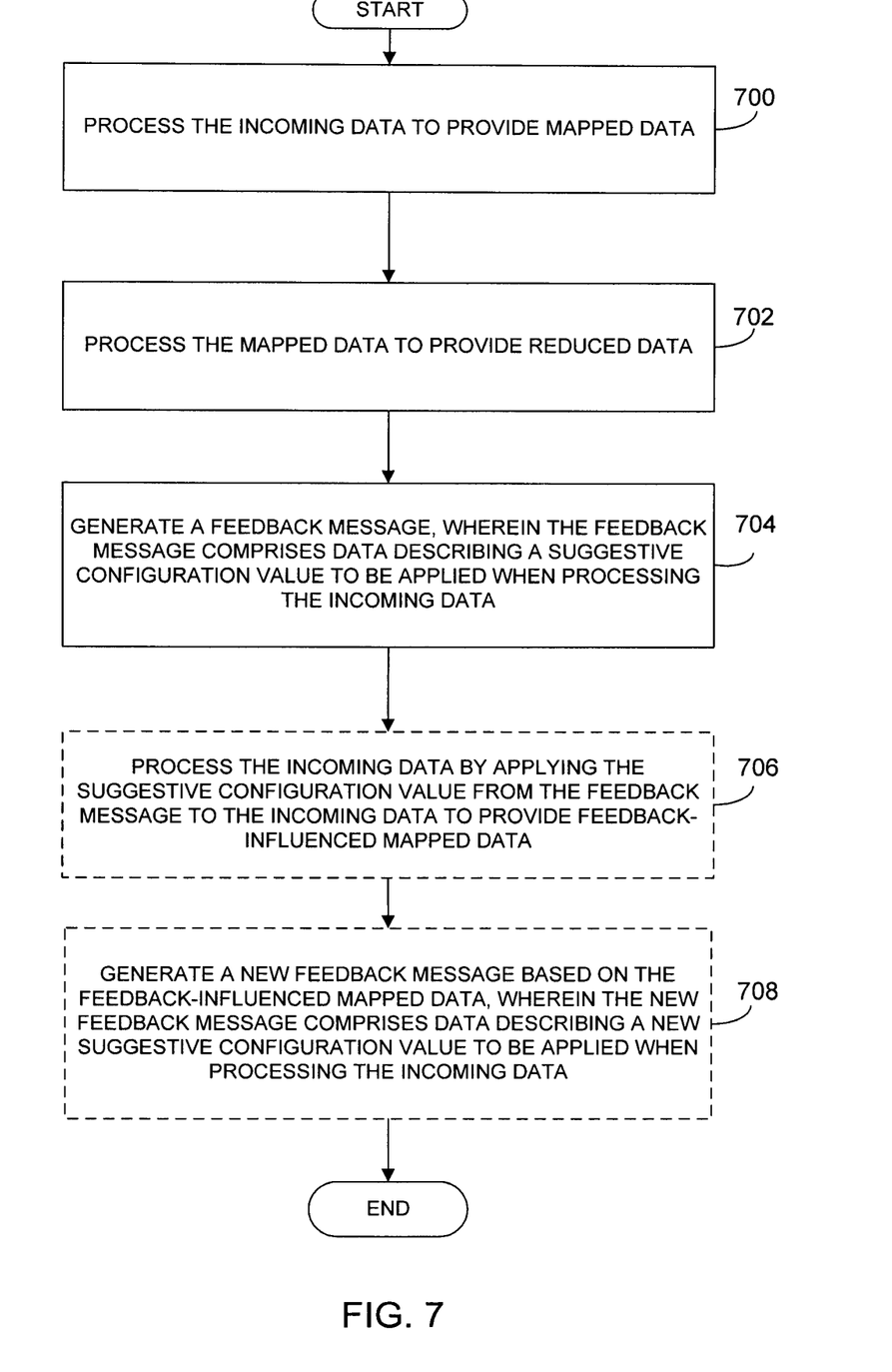
FIG. 7 is a flowchart illustrating a method for processing incoming data using a plurality of mapper modules and at least one reducer module in accordance with the instant disclosure.

Referring now to FIG. 7, a flow chart illustrating a method for processing incoming data using a plurality of mapper modules and at least one reducer module is provided. While the processing device 600 is a form for implementing the processing described herein (including that illustrated in FIG. 7), those having ordinary skill in the art will appreciate that other, functionally equivalent techniques may be employed. For example, rather than using a single processing device 600, the functionality described herein may be separated over multiple processing devices. Furthermore, as known in the art, some or all of the functionalities implemented via executable instructions may also be implemented using firmware and/or hardware devices such as application specific integrated circuits (ASICs), programmable logic arrays, state machines, etc. Further still, other implementations of the processing device 600 may include a greater or lesser number of components than those illustrated. Once again, those of ordinary skill in the art will appreciate the wide number of variations that may be used is this manner.

Beginning at block 700, incoming data is processed to provide mapped data. This processing may be accomplished by, for example, the mapper modules 204a, 204n of FIG. 2. At block 702, the mapped data is processed to provide reduced data. This processing may be accomplished by, for example, the reducer module 206. At block 704, a feedback message is generated. This may be accomplished by, for example, the reducer module 206. The feedback message includes data describing a suggestive configuration value to be applied when processing the incoming data. At optional step 706, the incoming data is processed by applying the suggestive configuration value from the feedback message to provide feedback-influenced mapped data. This processing may be accomplished by, for example, the mapper modules 204a, 204n. At optional block 708, a new feedback message is generated based on the feedback-influenced mapped data. This may be accomplished by, for example, the reducer module 206. The new feedback message includes data describing a new suggestive configuration value to be applied when processing the incoming data.

While particular embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
   processing, by one or more mapper devices, first incoming data to provide mapped data;
   providing, by the one or more mapper devices, the mapped data to one or more reducer modules;
   processing, by the one or more reducer devices, the mapped data to generate reduced data;
   generating, by the one or more reducer devices, a feedback message, the feedback message comprising configuration information;
   outputting, by the one or more reducer devices, the reduced data;
   providing, by the one or more reducer devices to the one or more mapper devices, the feedback message;
   processing, by at least one of the one or more mapper devices, second incoming data based on the configuration information in the feedback message and by applying one or more suggestive configuration values associated with the feedback message to the second incoming data to provide feedback-influenced mapped data;
   receiving, by the one or more reducer devices, the feedback-influenced mapped data; and
   generating, by the one or more reducer devices, another feedback message based on the feedback-influenced mapped data, the other feedback message including configuration information associated with another suggestive configuration value.

2. The method of claim 1, where
   at least another one of the one or more mapper devices processes the second incoming data without applying one or more suggestive configuration values associated with the feedback message to the second incoming data to provide non-feedback-influenced mapped data,
   the at least another one of the one or more mapper devices being different than the at least one of the one or more mapper devices.

3. The method of claim 1, further comprising:
   processing, by the one or more reducer devices, the feedback-influenced mapped data to provide feedback-influenced reduced data.

4. The method of claim 1, further comprising:
   transmitting, by the one or more reducer devices, the feedback message directly to at least one of the one or more mapper devices.

5. The method of claim 1, further comprising:
   receiving, by the one or more reducer devices, mapper module identification data from a name node device; and
   where, when providing the feedback message, the method includes:
      providing, by the one or more reducer devices, the feedback message directly to the one or more mapper modules based on the mapper module identification data.

6. The method of claim 1, further comprising:
   transmitting, by the one or more reducer devices, the feedback message to a name node device; and
   transmitting, by the name node device, the feedback message to the one or more mapper devices.

7. The method of claim 1, further comprising:
   transmitting, by the one or more reducer devices, the feedback message to a messaging system device;
   subscribing, by the one or more mapper devices, to the feedback message; and
   transmitting, by the messaging system device and based on the one or more mapper devices subscribing to the feedback message, the feedback message to the one or more mapper devices.

8. The method of claim 1, where at least one of the one or more mapper devices includes a listener thread in communication with a worker thread, and the method further comprises:
   receiving, by the listener thread, the feedback message;
   processing the second incoming data by the worker thread; and
   receiving, by the worker thread, the one or more suggestive configuration values associated with the feedback message from the listener thread.

9. A method comprising:
   processing, by one or more mapper devices, first incoming data to provide mapped data;
   providing, by the one or more mapper devices, the mapped data to one or more reducer modules;
   processing, by the one or more reducer devices, the mapped data to generate reduced data;
   generating, by the one or more reducer devices, a feedback message, the feedback message comprising configuration information;
outputting, by the one or more reducer devices, the reduced data;
providing, by the one or more reducer devices, the feedback message to another device;
receiving, by the one or more mapper devices and from the other device, the feedback message; and
processing, by at least one of the one or more mapper devices, second incoming data based on the configuration information in the feedback message and by applying one or more suggestive configuration values associated with the feedback message to the second incoming data to provide feedback-influenced mapped data;
receiving, by the one or more reducer devices, the feedback-influenced mapped data; and
generating, by the one or more reducer devices, another feedback message based on the feedback-influenced mapped data, the other feedback message including configuration information associated with another suggestive configuration value.

10. The method of claim 9, further comprising:
processing, by the one or more mapper devices, third incoming data based on the other feedback message.

11. The method of claim 9, where, when processing the second incoming data, the method further comprises:
processing the second incoming data using the configuration information after an expiration of a predetermined period of time.

12. The method of claim 9, further comprising:
transmitting, by the one or more mapper devices, a request to the other device.

13. The method of claim 12, further comprising:
receiving, by other device, the request; and
transmitting, by the other device and based on receiving the request, the feedback message.

14. The method of claim 9, further comprising:
subscribing, by one or more mapper devices, to the feedback message;
receiving, by the one or more mapper devices and from the other device, a notification that the feedback message is available; and
receiving, by the one or more mapper devices and based on receiving the notification, the feedback message.

15. A system comprising:
Processor; and
one or more mapper devices to:
process first incoming data to provide mapped data; and
provide the mapped data to one or more reducer devices; and
the one or more reducer devices to:
process the mapped data to generate reduced data;
generate a feedback message, the feedback message comprising configuration information;
output the reduced data; and
provide, to the one or more mapper devices, the feedback message, at least one of the one or more mapper devices being further to:
process second incoming data based on the configuration information in the feedback message and by applying one or more suggestive configuration values associated with the feedback message to the second incoming data to provide feedback-influenced mapped data; and
the one or more reducer modules being further to:
receive the feedback-influenced mapped data; and
generate another feedback message based on the feedback-influenced mapped data, the other feedback message including configuration information associated with another suggestive configuration value.

16. The system of claim 15, where the one or more reducer devices are further to:
process the feedback-influenced mapped data to provide feedback-influenced reduced data.

17. The system of claim 15, where the one or more reducer devices are further to:
transmit the feedback message directly to the one or more mapper devices.

18. The system of claim 15, where the one or more reducer devices are further to:
receive mapper module identification data from a name node device; and
where, when providing the feedback message, the one or more reducer devices are further to:
provide the feedback message directly to the one or more mapper devices based on the mapper module identification data.

19. The system of claim 15, where the one or more reducer devices are further to:
transmit the feedback message to a name node device,
the name node device being to:
transmit the feedback message to the one or more mapper devices.

20. The system of claim 15, where
the one or more reducer devices are further to:
transmit the feedback message to a messaging system device;
the one or more mapper devices are further to:
subscribe to the feedback message; and
the messaging system device is to:
transmit, based on the one or more mapper devices subscribing to the feedback message, the feedback message to the one or more mapper devices.

21. The system of claim 15, where the one or more mapper devices include a listener thread in communication with a worker thread, and the one or more mapper devices are further to:
receive, using the listener thread, the feedback message;
process, using the worker thread, the second incoming data; and
receive, using the worker thread, the one or more suggestive configuration values associated with the feedback message from the listener thread.

22. A system comprising:
Processor; and
one or more mapper devices to:
process first incoming data to provide mapped data; and
provide the mapped data to one or more reducer modules; and
the one or more reducer devices being to:
process the mapped date to provide reduced data;
generate a feedback message, the feedback message comprising configuration information;
output the reduced data; and
provide the feedback message to another device, at least one of the one or more mapper devices being further to:
receive, from the other device, the feedback message; and
process second incoming data based on the configuration information in the feedback message and by applying one or more suggestive configuration values associated with the feedback message to the second incoming data to provide feedback-influenced mapped data; and the one or more reducer modules being further to:
receive the feedback-influenced mapped data; and
generate another feedback message based on the feedback-influenced mapped data, the other feedback message including configuration information associated with another suggestive configuration value.

23. The system of claim 22, where the one or more mapper devices are further to:
process third incoming data based on the other feedback message.

24. The system of claim 22, where, when processing the second incoming data, the one or more mapper devices are further to:
process the second incoming data using the configuration information after an expiration of a predetermined period of time.

25. The system of claim 22, where the one or more mapper devices are further to:
transmit a request to the other device.

26. The system of claim 25, where the other device is to:
receive the request; and
transmit, based on receiving the request, the feedback message.

27. The system of claim 22, where the one or more mapper devices are further to:
subscribe to the feedback message;
receive, from the other device, a notification that the feedback message is available; and
receive, based on receiving the notification, the feedback message.

28. A device comprising:
a memory to store instructions; and
a processor to execute the instructions to:
process first incoming data to provide mapped data; and
provide the mapped data to one or more other devices, the one or more other devices being different than the device, the mapped data being processed to generate reduced data, the reduced data being output, and the mapped data being used to generate a feedback message, the feedback message comprising configuration information;
receive the feedback message; and
process second incoming data based on the configuration information in the feedback message and by applying one or more suggestive configuration values associated with the feedback message to the second incoming data to provide feedback-influenced mapped data;
provide the feedback-influenced mapped data; and
receive another feedback message based on the feedback-influenced mapped data, the other feedback message including configuration information associated with another suggestive configuration value.

29. The device of claim 28, where the processor is further to:
process third incoming data without applying one or more suggestive configuration values associated with the feedback message to the third incoming data to provide non-feedback-influenced mapped data.

30. The device of claim 28, where the processor is further to:
process third incoming data based on the other feedback message.

31. The device of claim 28, where the processor is further to:
process the second incoming data using the configuration information after an expiration of a predetermined period of time.

32. The device of claim 28, where the processor is further to:
transmit a request to another device,
the other device being different than the one or more other devices; and
receive, from the other device and based on transmitting the request, the feedback message.

33. The device of claim 32, where the processor is further to:
subscribe to the feedback message; and
receive, based on subscribing to the feedback message, the feedback message from the other device.

34. The device of claim 28, where the feedback message is received directly from the one or more other devices.

35. A device comprising:
a memory to store instructions; and
a processor to execute the instructions to:
receive mapped data, the mapped data being generated based on first incoming data;
process the mapped data to generate reduced data, output the reduced data;
generate a feedback message, the feedback message comprising configuration information;
provide, to another device, the feedback message, the other device being different than the device, and the other device processing second incoming data based on the configuration information in the feedback message and by applying one or more suggestive configuration values associated with the feedback message to the second incoming data to provide feedback-influenced mapped data;
receive the feedback-influenced mapped data; and
generate another feedback message based on the feedback-influenced mapped data, the other feedback message including configuration information associated with another suggestive configuration value.

36. The device of claim 35, where the processor is further to:
process the feedback-influenced mapped data to provide feedback-influenced reduced data.

37. The device of claim 35, where the processor is further to:
transmit the feedback message directly to the other device.

38. The device of claim 35, where the processor is further to:
transmit the feedback message to another, different device, the other, different device being different than the other device,
the feedback message being transmitted to the other device by the other, different device.

39. The device of claim 35, where third incoming data is processed without applying one or more suggestive configuration values associated with the feedback message to the third incoming data to provide non-feedback-influenced mapped data.

40. The device of claim 35, where the feedback message is transmitted directly to the other device.

* * * * *